(12) United States Patent
Agiwal et al.

(10) Patent No.: US 12,323,904 B2
(45) Date of Patent: Jun. 3, 2025

(54) METHOD AND APPARATUS HANDLING PAGING AND SYSTEM INFORMATION (SI) OF A MULTIUNIVERSAL SUBSCRIBER IDENTIFY MODULE (MUSIM) USER EQUIPMENT (UE)

(71) Applicant: Samsung Electronics Co., Ltd., Suwon-si (KR)

(72) Inventors: Anil Agiwal, Suwon-si (KR); Mangesh Abhimanyu Ingale, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 17/762,702

(22) PCT Filed: Sep. 24, 2020

(86) PCT No.: PCT/KR2020/013009
§ 371 (c)(1),
(2) Date: Mar. 22, 2022

(87) PCT Pub. No.: WO2021/060893
PCT Pub. Date: Apr. 1, 2021

(65) Prior Publication Data
US 2022/0369211 A1 Nov. 17, 2022

(30) Foreign Application Priority Data
Sep. 24, 2019 (IN) .............................. 201911038561

(51) Int. Cl.
*H04W 48/16* (2009.01)
*H04W 68/02* (2009.01)
*H04W 88/06* (2009.01)

(52) U.S. Cl.
CPC ........... *H04W 48/16* (2013.01); *H04W 68/02* (2013.01); *H04W 88/06* (2013.01)

(58) Field of Classification Search
CPC ...... H04W 48/16; H04W 68/02; H04W 88/06
See application file for complete search history.

(56) References Cited

U.S. PATENT DOCUMENTS 9,674,758 B2 6/2017 Tsai et al.
10,492,169 B2 11/2019 Chen et al.
(Continued)

FOREIGN PATENT DOCUMENTS

| JP | 2017-525211 A | 8/2017 | |
|---|---|---|---|
| WO | WO-2018231352 A1 * | 12/2018 | ............ H04W 48/18 |
| WO | 2019/164325 A1 | 8/2019 | |

OTHER PUBLICATIONS

3GPP TS 38.523-1 v16.0.0 (Jun. 2019) Technical Specification 3rd Generation Partnership Project; Technical Specification Group Radio Access Network; 5GS; User Equipment (UE) conformance specification; Part 1: Protocol (Release 16). (Year: 2019).*
(Continued)

*Primary Examiner* — Yuwen Pan
*Assistant Examiner* — Swati Jain (57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method performed by a terminal in a wireless communication system is provided.

8 Claims, 8 Drawing Sheets

(56) References Cited

U.S. PATENT DOCUMENTS

| | | | |
|---|---|---|---|
| 11,297,597 B2 | 4/2022 | Lee | |
| 2013/0303203 A1* | 11/2013 | Wang | H04W 68/00 |
| | | | 455/458 |
| 2014/0362752 A1* | 12/2014 | Jha | H04L 5/0032 |
| | | | 370/311 |
| 2015/0373531 A1* | 12/2015 | Goel | H04W 60/005 |
| | | | 370/328 |
| 2016/0142998 A1* | 5/2016 | Tsai | H04W 36/00833 |
| | | | 455/458 |
| 2017/0048920 A1* | 2/2017 | Kim | H04W 48/16 |
| 2017/0280507 A1 | 9/2017 | Wang | |
| 2018/0020464 A1* | 1/2018 | Liang | H04W 76/28 |
| 2018/0220329 A1* | 8/2018 | Arumugam | H04L 65/1073 |
| 2018/0227880 A1* | 8/2018 | Su | H04W 68/02 |
| 2018/0324747 A1* | 11/2018 | Keskitalo | H04W 48/08 |
| 2018/0368099 A1* | 12/2018 | Chen | H04W 48/18 |
| 2019/0069193 A1* | 2/2019 | Astrom | H04W 52/028 |
| 2019/0223145 A1* | 7/2019 | Jung | H04W 68/005 |
| 2020/0396760 A1* | 12/2020 | Yi | H04L 1/1812 |
| 2023/0007624 A1* | 1/2023 | Murray | H04W 68/005 |

OTHER PUBLICATIONS

3GPP TS 38.523-1 v16.0.0 (Jun. 2019) Technical Specification 3rd Generation Partnership Project; Technical Specification Group Radio Access Network; 5GS; User Equipment (UE) conformance specification; Part 1: Protocol (Release 16). (Year: 2019) (Year: 2019).*
Supplementary European Search Report dated Aug. 3, 2022 in connection with European Patent Application No. 20 86 8182, 9 pages.
International Search Report and Written Opinion of the International Searching Authority dated Jan. 12, 2021, in connection with International Application No. PCT/KR2020/013009, 7 pages.
3GPP TS 38.523-1 V16.0.0 (Jun. 2019), Technical Specification, 3rd Generation Partnership Project; Technical Specification Group Radio Access Network; 5GS; User Equipment (UE) conformance specification; Part 1: Protocol (Release 16), Jun. 2019, 5 pages.
3GPP TS 33.320 V16.0.0 (Jul. 2020), Technical Specification, 3rd Generation Partnership Project; Technical Specification Group Services and System Aspects; Security of Home Node B (HNB) / Home evolved Node B (HeNB) (Release 16), Jul. 2020, 40 pages.
The First Office Action dated Mar. 12, 2024, in connection with Chinese Application No. 202080066769.7, 14 pages.
Examination report dated Feb. 22, 2024, in connection with Indian Application No. 201911038561, 6 pages.

* cited by examiner

METHOD AND APPARATUS HANDLING PAGING AND SYSTEM INFORMATION (SI) OF A MULTIUNIVERSAL SUBSCRIBER IDENTIFY MODULE (MUSIM) USER EQUIPMENT (UE)

CROSS-REFERENCE TO RELATED APPLICATIONS

This application is a 371 National Stage of International Application No. PCT/KR2020/013009, filed Sep. 24, 2020, which claims priority to Indian Provisional Patent Application No. 201911038561, filed Sep. 24, 2019, the disclosures of which are herein incorporated by reference in their entirety.

BACKGROUND

1. Field

The disclosure relates to system and method of handling paging and system information (SI) of a multi-universal subscriber identity module (MUSIM) user equipment (UE).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long term evolution (LTE) System.' The 5G wireless communication system is considered to be deployed not only in lower frequency bands e.g. 500 MHz to 10 GHz bands, but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In the last few decades, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, the design of the air-interface of the 5G wireless communication system will be flexible enough to serve the user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g., like tens of Gbps data rate, low-latency, high-mobility and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility and so on) address the market segment representing the Industrial automation application and vehicle-to-vehicle/vehicle-to-infrastructure communication that is foreseen as one of the enablers for autonomous cars.

In the 4G wireless communication system like LTE, there are devices which have multi-universal subscriber identity module (MUSIM) capability, particularly dual SIM devices have proliferated over the past decade. The dual SIM devices operation is transparent to the network and certain procedures like paging monitoring and responding to paging, measurements, system information (SI) acquisition etc. are currently handled in implementation specific way. In other words, there is no standard support for efficiently handling the aforementioned procedures. This has resulted not only in degradation of user experience in terms of loss of data throughput but also wastage of network resources. The dual SIM devices have different radio frequency transmit-receive (RF Tx/Rx) capability and the implementation specific solutions to handle the aforementioned procedures are not same but depend on the RF capability of the dual SIM device. Depending on the RF Tx/Rx capability, following types of dual SIM devices are available a) dual SIM dual standby (DSDS) with single Tx/Rx RF capability, b) dual SIM dual receive (DSDR) with single Tx and dual Rx RF capability and c) dual SIM dual active (DSDA) with dual Tx/Rx RF capability.

The term dual SIM and MUSIM UE or device is used interchangeable throughout the disclosure. The dual SIM device is required to monitor the paging occasion and other time critical occasions such as essential system information blocks (SIBs), cell broadcast information, multimedia broadcast multicast services (MBMS) and the like, on the respective system (network) associated with each USIM. In general, system with each USIM independently decides these occasions. The paging or SI occasion of one USIM may collide with paging and other time critical occasions of other USIMs. These collisions are handled in a specific manner according to UE implementations as there is no standard mechanism devised for MUSIM UE from the 3rd generation partnership project (3GPP) standardization perspective. Therefore, this may sometime result in missing of the paging or time critical occasions for handling of paging collisions for MUSIM devices. Recently, there is discussion within the 3GPP standardization to specify enablers to handle the aforementioned procedures regardless of the UE RF capability. This would be applicable to LTE system connected to evolved packet core (EPC) and new radio (NR) system connected to 5G core (5GC). For e.g. a UE may support dual SIM capability associated with global system for mobile communication (GSM)+GSM, GSM+LTE, LTE+LTE, LTE+voice over LTE (VoLTE), VoLTE+VoLTE, VoLTE+NR, LTE+NR, NR+NR so on and so forth.

The above information is presented as background information only, and to assist with an understanding of the disclosure. No determination has been made, and no assertion is made, as to whether any of the above might be applicable as prior art with regard to the disclosure.

SUMMARY

The principal object of the embodiments herein is to disclose methods and system for achieving efficiently handling of paging procedure and system information (SI) acquisition by the dual subscriber identity module (SIM)/multi-universal SIM (MUSIM) devices regardless of the transmit-receive (Tx/Rx) capability. This is applicable when the device is registered on evolved packet core (EPC) through both SIMS, registered on $5^{th}$ generation core (5GC) through both SIMs, or registered on EPC through one SIM and registered on 5GC through the other SIM. In general, device is registered on same system (e.g. global system for mobile communication (GSM), code division multiple access (CDMA), long term evolution (LTE), new radio (NR), or any other radio access technology (RAT)) using both SIMs or different system using different SIM. The embodiments in the disclosure are illustrated using dual SIM as an example but can be extended further to plurality of SIMs.

Aspects of the disclosure are to address at least the above-mentioned problems and/or disadvantages and to provide at least the advantages described below. Accordingly, an aspect of the disclosure is to provide a communication method and system for converging a 5G communication system for supporting higher data rates beyond a $4^{th}$ generation (4G) system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method comprises in case that a terminal has at least two subscriber identity module (SIM) capabilities, monitoring a system information (SI) update indication in at least one first paging occasion of at least one modification period for a first network associated with a first SIM, in case that the terminal fails to monitor the at least one first paging occasion, monitoring the SI update indication in at least one second paging occasion, determining whether any SI is updated or not based on the SI update indication, and in case that any SI is updated, acquiring the updated SI.

In accordance with another aspect of the disclosure, a terminal in a wireless communication system is provided. The terminal includes a transceiver and at least one processor operatively coupled with the transceiver. The at least one processor is configured to: in case that the terminal has at least two SIM capabilities, monitor a system information (SI) update indication in at least one first paging occasion of at least one modification period for a first network associated with a first SIM; in case that the at least one processor fails to monitor the at least one first paging occasion, monitor the SI update indication in at least one second paging occasion; determine whether any SI is updated or not based on the SI update indication; and in case that any SI is updated, acquire the updated SI.

Various methods and systems which efficiently handles the paging transmission/reception and system information (SI) acquisition by the dual subscriber identity module (SIM)/multi-universal SIM (MUSIM) devices regardless of the transmit-receive (Tx/Rx) capability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

System Information Aspects

In the wireless communication system, node B (gNB) or base station in cell broadcasts system information (SI). SI includes common parameters needed to communicate in cell. In the 5G wireless communication system (also referred as next generation radio or NR), SI is divided into the master information block (MIB) and a number of system information blocks (SIBs) where:

the MIB is always transmitted on the broadcast channel (BCH) (or physical BCH (PBCH)) with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SI message(s) are being broadcasted or not, in case of not being broadcasted, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. In the SI-window, UE monitors the physical downlink control channel (PDCCH) monitoring occasions (i.e. symbols/slots) configured for SI message reception. For SI message acquisition PDCCH monitoring occasion(s) are determined according to osi-searchSpace. If osi-searchSpace is set to zero (also referred as default association), PDCCH monitoring occasions for SI message reception in SI-Window are same as PDCCH monitoring occasions for SIB1. If osi-searchSpace is not set to zero (also referred as non-default association), PDCCH monitoring occasions for SI message is determined based on search space indicated by osi-searchSpace.

In 5G (also referred as NR or New Radio) wireless communication system, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a bandwidth part (BWP). In radio resource control (RRC) CONNECTED state, UE is configured with one or more DL and uplink (UL) BWPs, for each configured Serving Cell (i.e. primary cell (PCell) or secondary cell (SCell)). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a DL assignment or a UL grant, by the bwp-InactivityTimer, by RRC signaling, or by the media access control (MAC) entity itself upon initiation of Random Access procedure. Upon addition of special cell (SpCell) or activation of an SCell, the DL BWP and UL BWP indicated by firstActiveDownlinkBWP-Id and firstActiveUplinkBWP-Id respectively is active without receiving PDCCH indicating a DL assignment or a UL grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer, UE switches to the active DL BWP to the default DL BWP or initial DL BWP (if default DL BWP is not configured).

In the frequency domain, bandwidth (or control resource set (CORESET)) for SI message and paging reception is the initial DL BWP for UEs in RRC IDLE and RRC INACTIVE state. The initial DL BWP parameters are configured by MIB. Bandwidth (or CORESET) for SI message and paging reception is the active DL BWP for UEs in RRC CONNECTED state. In RRC CONNECTED state, if osi-searchSpace is not signaled for active DL BWP, SI is not broadcasted in that active DL BWP.

SI broadcasted in a cell can be updated. In order to update the SI, modification period concept is used. A modification period is used, i.e. updated SI (other than for earthquake and tsunami warning system (ETWS) and commercial mobile alert system (CMAS)) is broadcasted in the modification period following the modification period where SI change indication is transmitted. If SI change indication is sent by gNB in modification period N, then the updated SI is broadcasted from modification period N+1. The modification period boundaries are defined by system frame number (SFN) values for which SFN mod m=0, where m is the number of radio frames comprising the modification period.

The modification period is configured by SI. The UE receives indications about SI modifications and/or public warning system (PWS) notifications using Short Message transmitted with paging radio network temporary identifier (P-RNTI) over DL control information (DCI). Within a modification period SI change indication and/or PWS notification can be repeated multiple times. Each modification period is multiple of default discontinuous reception (DRX) cycle. Length of default DRX cycle is broadcasted by gNB in SI (i.e. in SIB1). SI change indication and/or PWS notification is transmitted in each paging occasion (PO) of default DRX cycle, so that each UE can receive the SI change indication and/or PWS notification. Note that there can be multiple POs in a DRX cycle and UE determines a PO to be monitored based on its UE identifier (ID).

UEs in RRC_IDLE or in RRC_INACTIVE monitors for SI change indication in its own PO every DRX cycle. UEs in RRC CONNECTED monitors for SI change indication in any PO at least once per modification period if the UE is provided with common search space to monitor paging in active DL BWP. ETWS or CMAS capable UEs in RRC_IDLE or in RRC_INACTIVE monitor for indications about PWS notification in its own PO every DRX cycle. ETWS or CMAS capable UEs in RRC CONNECTED monitor for indication about PWS notification in any PO at least once every default DRX cycle (also referred as default paging cycle) if the UE is provided with common search space to monitor paging in active DL BWP.

Figure 1:
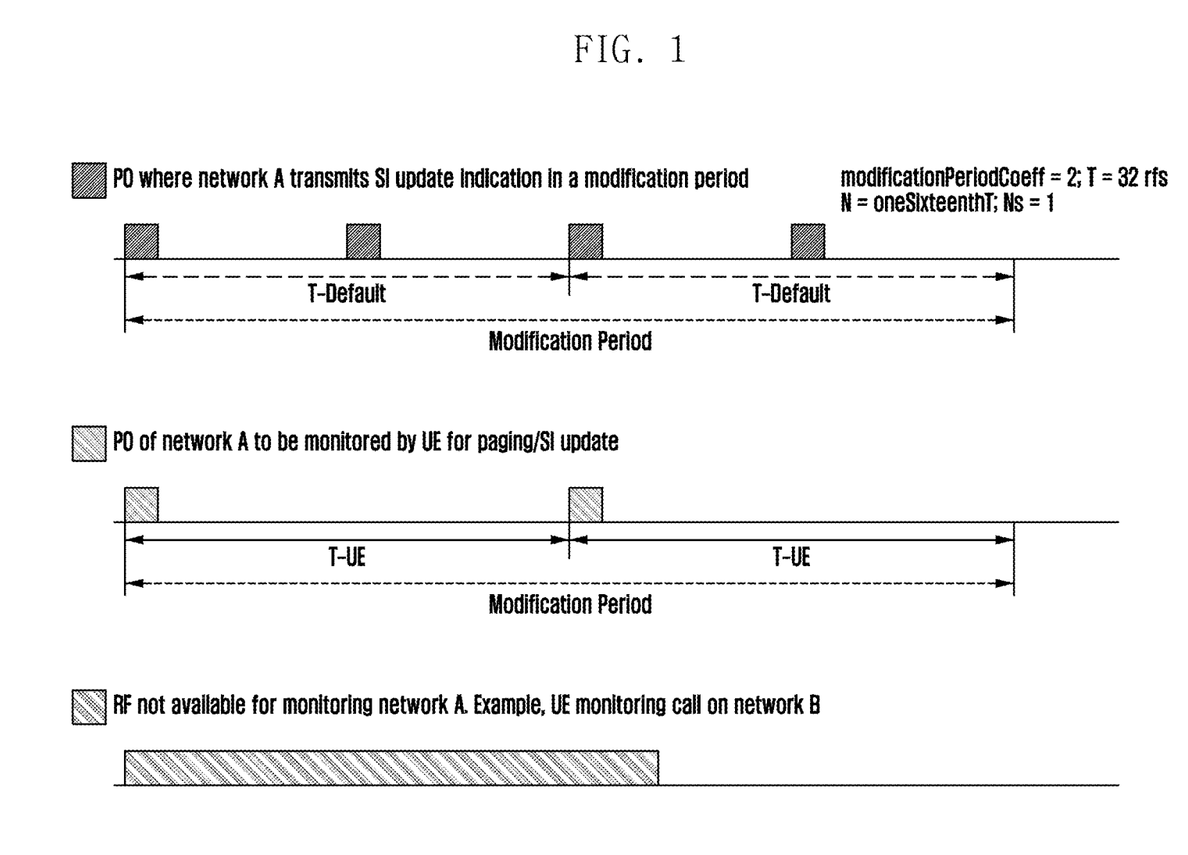
FIG. 1 illustrates an issue that an user equipment (UE) does not have the latest version of SI used in Network A and affects its operation in network A.

Issue: In case of MUSIM UE, UE may miss to monitor SI update indication in a modification period of Network A due to unavailability of radio frequency (RF) for monitoring Network A. As a result UE does not have the latest version of SI used in Network A and affects its operation in Network A. This issue is further illustrated using the FIG. 1. The FIG. 1(a) shows the default DRX cycle (T-Default), modification period and POs configured in a cell of Network A, where the cell is the serving/camped cell of UE. The value of modificationPeriodCoeff is equal to 2 resulting in a modification period consisting of two DRX cycles. FIG. 1 (b) shows the UE's DRX cycle and the PO which UE monitors for receiving paging and SI update indication. FIG. 1 (c) shows the time interval where RF is not available for monitoring Network A as UE may be monitoring call or performing other tasks on Network B. In the scenario illustrated in FIG. 1, UE is not able to monitor any of its PO in modification period. As a result UE and Network A will be out of synchronization (sync) with respect to SI if Network A has sent SI update indication in the modification period.

Figure 2:
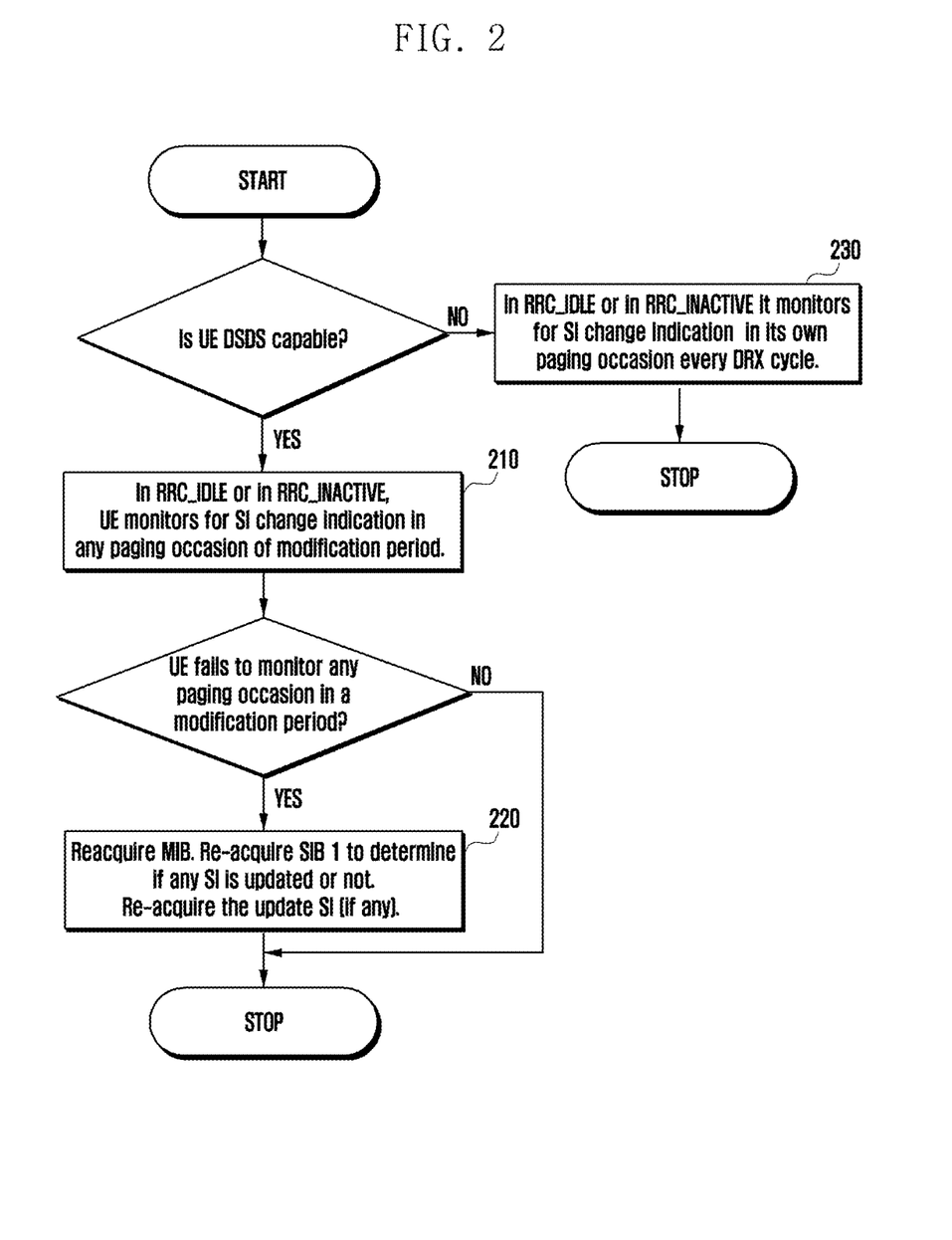
FIG. 2 illustrates the operation of the UE according to an embodiment based on the disclosure.

In order to resolve the above issue, in an embodiment of this disclosure UE performs the operations as illustrated in FIG. 2. In RRC_IDLE or in RRC_INACTIVE state:

if UE is dual SIM dual standby (DSDS) capable (or UE is a MUSIM UE which is not able to monitor networks associated with multiple SIMS concurrently or UE does not have a dedicated RF to monitor SI for this network), UE monitors for SI change indication in any PO every modification period at operation 210. In other words, UE monitors PDCCH addressed to paging radio network temporary identifier (P-RNTI) for short message in any PO every modification period. In an embodiment, UE monitors for paging in its PO every DRX cycle. In another embodiment, UE monitors for paging in any PO every modification period.

If UE fails (e.g. due to RF being not available, i.e. being busy in monitoring another network) to monitor any PO in a modification period, UE re-acquires MIB, and re-acquires SIB1 to determine if any SI is updated or not at operation 220. UE then re-acquire the update SI (if any).

If UE fails to monitor any PO for 'N' consecutive modification periods, UE re-acquires MIB, and re-acquires SIB1 to determine if any SI is updated or not. UE then re-acquire the update SI (if any). The value of 'N' can be pre-defined or can be signaled by network (e.g. base station, NB, gNB) in SI.

Otherwise, UE monitors for SI change indication in its PO every DRX cycle at operation 230. UE monitors for paging in its PO every DRX cycle. UE selects one PO among the multiple POs in a DRX cycle based on its UE ID.

In RRC IDLE/INACTIVE state, if UE is not able to monitor its PO in a modification period of network associated with SIM 1 because of monitoring other SIM 2, one of the following can be performed by UE:

Option 1: UE can monitor SI update indications in other POs in modification period of network associated with SIM 1 as long as it is not overlapping with monitoring of other SIM 2. In other words, UE can monitor SI update indications in any of the PO (not just its PO) in modification period as long as it is not overlapping with its other RAT/SIM monitoring.

Option 2: if UE fails to monitor SI update indication in modification period of network associated with SIM 1 because of monitoring SIM 2, upon resuming monitoring of network associated with SIM 1, UE first reads MIB and SIB1 to determine if any SI is updated or not. UE then re-acquire the update SI (if any). In other words, if UE fails to monitor SI update indication in modification period because of other RAT/SIM monitoring, upon resuming monitoring of this RAT UE reads MIB and SIB 1 to determine if any SI is updated or not.

Option 3: Option 2 may be applied if it fails to monitor SI update indication in its PO.

Option 4: Option 2 may be applied if it fails to monitor SI update indication in any PO of a modification period.

Figure 3:
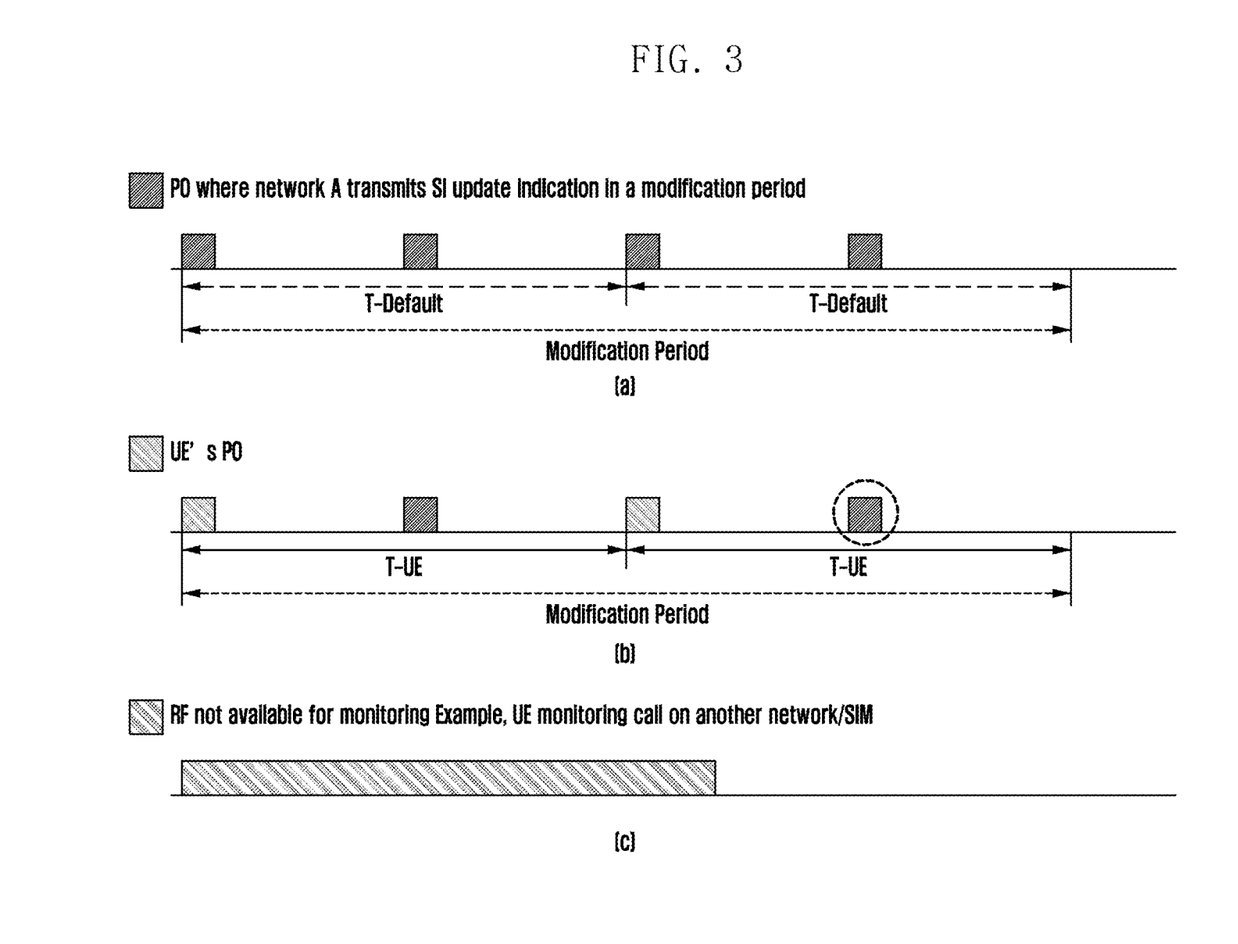
FIG. 3 is an example illustration of proposed operation according to an embodiment based on the disclosure.

FIG. 3 is an example illustration of proposed operation according to an embodiment based on the disclosure. Referring to FIG. 3(b), there are 4 POs in a modification period. POs determined of paging/SI update monitoring based on UE ID are $1^{st}$ and $3^{rd}$ POs. Since the RF is not available for monitoring these POs as shown in FIG. 3(c), UE monitors the $4^{th}$ PO in modification period even though it is not the UE's PO.

Paging Aspects

In the wireless communication system, the paging is transmitted to page UE which are attached to the wireless communication network but are in idle/inactive mode. In the idle/inactive mode UE wakes up at regular intervals (i.e. every paging DRX cycle) for short periods to receive paging message, short message and other broadcast information. Network may configure several POs in a DRX cycle. In a PO, PDCCH addressed to P-RNTI is transmitted. The DCI of PDCCH addressed to P-RNTI includes short message and/or scheduling information for paging message. Paging message is transmitted using physical downlink shared channel (PDSCH). The short message indicator field in DCI of PDCCH addressed to P-RNTI indicates whether only scheduling information for paging is present in the DCI or only short message is present in the DCI or both scheduling information for Paging and short message are present in the DCI. Short message includes SystemInfoModification bit and etwsAndCmasIndication bit. SystemInfoModification bit set to 1 indicates SI update other than SIB6, SIB7 and SIB8. etwsAndCmasIndication bit set to 1 indicates ETWS primary notification and/or an ETWS secondary notification and/or a CMAS notification. P-RNTI is common for all UEs. So UE identity is included in paging message to indicate paging for a specific UE. In case of core network (CN) paging UE, paging UE identity is system architecture evolution (SAE)-temporary mobile subscriber identity (S-TMSI). In case of radio access network (RAN), paging UE identity is inactive RNTI (I-RNTI). For a paged UE, in addition to UE identity, accessType may also be included. accessType indicates whether the Paging message is originated due to the protocol data unit (PDU) sessions from the non-3rd generation partnership project (3GPP) access. For a paged UE, paging cause may also be included in paging message. For a paged UE, multiple paging causes may be included in paging message. Paging cause indicates the cause for paging. Paging cause can be critical services, Voice, short message service (SMS), internet protocol multimedia subsystem (IMS) Signaling, cyclic prefix (CP) Signaling and other data. For IDLE UE, the access and mobility management function (AMF) will forward to the paging cause(s) in paging message to NG-RAN. gNB in NR-RAN then includes it in paging message transmitted on PDSCH. For INACTIVE UE, NG-RAN determines the paging cause either based on the paging cause field included in the CN tunnel header of an incoming DL PDU or based on specific 5G quality of service (QoS) identifier (5QI) and allocation and retention priority (ARP) of the QoS flows for the DL data packet and paging policy indicator (PPI) in the CN tunnel header. Upon receiving paging message including UE's identity and paging cause(s), UE may respond to paging in one of the following ways depending on paging cause and ongoing activity on another SIM (for example depending on whether service indicated by paging cause is important (has higher priority) or not compared to ongoing activity on another SIM): UE in RRC idle may initiate connection setup procedure to enter connected state if service indicated by paging cause is important compared to ongoing activity on another SIM or there is no ongoing activity on another sim, wherein the UE sends RRCSetupRequest and establishmentCause in RRCSetupRequest is set to one of mps-PriorityAccess, mcs-PriorityAccess and mt-Access; OR UE may initiate procedure to send RRCSetupRequest if service indicated by paging cause is not important compared to ongoing activity on another SIM, wherein establishmentCause in RRCSetupRequest is set to mt-busy which indicates that UE is busy due to ongoing activity on another SIM. On receiving RRCSetupRequest with establishmentCause set to mt-busy, gNB may inform AMF that UE is busy due to ongoing activity on another SIM and sends RRCRelease message to UE. AMF may delay paging based on this indication from gNB. In addition to mt-busy, UE may also indicate how long it will be busy. On receiving RRCSetupRequest with establishmentCause set to mps-PriorityAccess or mcs-PriorityAccess or mt-Access, gNB sends RRCSetup message to UE to establish connection. Note that in case UE decides to indicate mt-busy, it may first request for gaps from base station of system of another SIM and use these gaps to respond to paging with mt-busy indication to gNB. In an embodiment, instead of setting establishmentCause to mt-busy, UE can set establishmentCause to mt-access and add an additional field in message indicating that UE is busy. In an embodiment, after sending the establishmentCause set to mt-busy or an additional field in message indicating that UE is busy, when the UE becomes available, UE may initiate procedure to send RRCSetupRequest, wherein establishmentCause in RRCSetupRequest is set to mt-busy or mt-available or a new field indicating that UE is available. Paging message may include multiple UE identities to page multiple UEs. Paging message is broadcasted (i.e. PDCCH is masked with P-RNTI) over data channel (i.e. PDSCH).

A UE monitors one PO every DRX cycle. The UE determines its PO based on UE_ID. The UE first determines the paging frame (PF) and then determines the PO with respect to the determined PF. One PF is a radio frame (10 ms). The PF for a UE is the radio frame with SFN which satisfies the equation (SFN+PF_offset) mod T=(T div N)* (UE_ID mod N); where PF_offset, T and N is signaled by gNB in SI. UE monitors $(i\_s+1)^{th}$ PO, where i_s=floor (UE_ID/N) mod Ns; where N and Ns is signaled by gNB in SI.

A PO is a set of PDCCH monitoring occasions and can consist of multiple time slots (e.g. subframe or orthogonal frequency division multiplexing (OFDM) symbol) where paging DCI can be sent. The PDCCH monitoring occasions for paging are determined according to pagingSearchSpace as specified in TS 38.213 and firstPDCCH-MonitoringOccasionOfPO if configured as specified in TS 38.331. When SearchSpaceId=0 is configured for pagingSearchSpace, the PDCCH monitoring occasions for paging are same as for remaining minimum system information (RMSI) as defined in clause 13 in TS 38.213. pagingSearchSpace is signaled by gNB in SI and/or RRCReconfiguration message. pagingSearchSpace is specific to BWP and UE uses the configuration in the active BWP in connected and initial DL BWP in case of IDLE/INACTIVE.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted synchronization signal blocks (SSBs) determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

Figure 4:
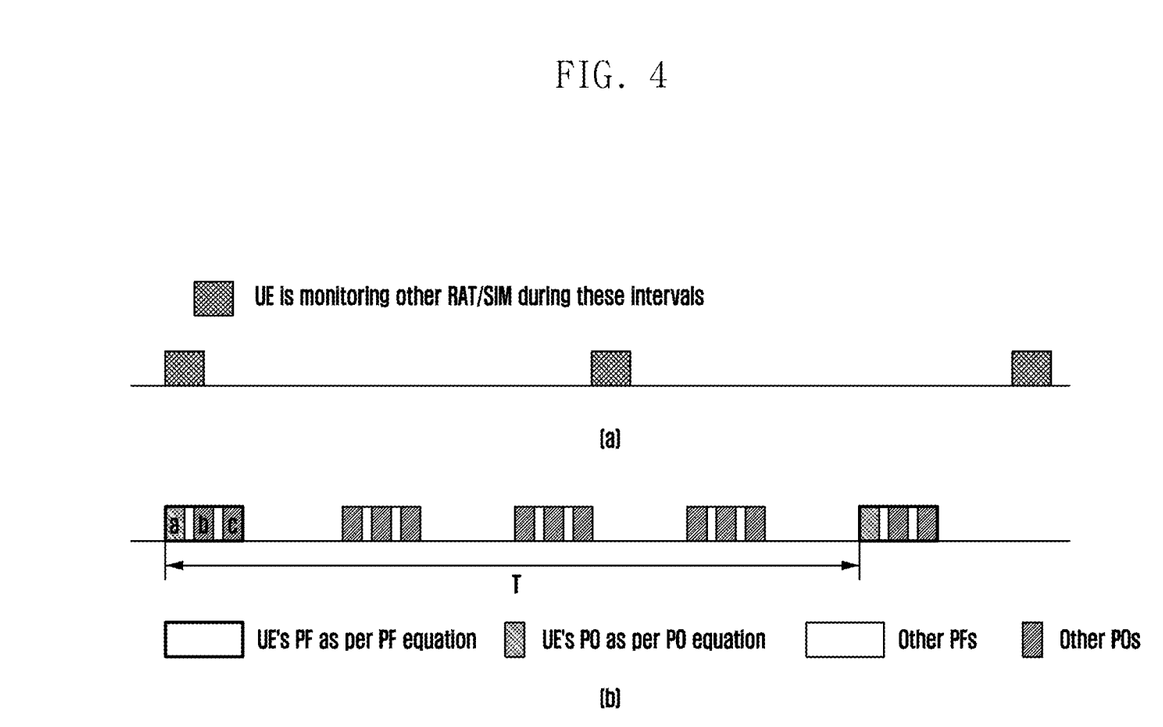
FIG. 4 illustrates an issue that paging is delayed.

Issue: In case of MUSIM UE, UE may miss to monitor paging from SIM A/Network A due to unavailability of RF during its PO as the RF is shared with another SIM B/Network B. As a result, paging will be delayed as Network A can retransmit the paging only in UE's PO in next DRX cycle. This issue is further illustrated using the FIG. 4. FIG. 4(a) illustrates the time intervals where UE monitors other SIM B (say Network B). During these intervals RF is not available for monitoring this SIM A (i.e. Network A). FIG. 4(b) illustrates the paging DRX cycle, PFs, POs, UE's PF and PO. It can be seen that UE's PO overlaps with the time when UE is monitoring Network B (monitoring in Network B can also be paging monitoring in Network B). As a result UE will miss paging.

In order to resolve the above issue, in an embodiment of this disclosure following operation is performed:

Step 1: UE sends its unavailability information (e.g. gap pattern/unavailability pattern) to AMF (of SIM A/Network A). Unavailability information indicates the time occasions when UE is unavailable to monitor DL (of SIM A/Network A) i.e. time occasions when UE is monitoring another SIM B/Network B. AMF (of SIM A/Network A) sends acknowledgement.

In an embodiment, UE indicates unavailability information based on its current cell's SFN timing. UE can send updated gap pattern/unavailability pattern to AMF when it moves to a cell which has timing different than the cell where UE has last sent the unavailability information. UE can also send updated gap pattern/unavailability pattern to AMF whenever pattern/unavailability pattern changes. UE can also notify AMF when UE is always available, i.e. it is no longer monitoring another SIM.

In an embodiment, UE indicates unavailability information based on global timing (such as coordinated universal time (UTC)). Unavailability information can be sent to AMF using non access stratum (NAS) signaling or RRC signaling message. In case of RRC signaling message, the information is first sent to gNB and then the gNB forwards the information to AMF.

In an embodiment, unavailability information may consist of parameters: period (P), duration (D) and offset (O). In this case, UE is unavailable for duration 'D' periodically where duration starts at SFN which satisfies, SFN mod P=offset 'O'. Offset 'O' can be zero as well. In an embodiment, UE may be partially unavailable during duration 'D'. A bitmap can additionally configured to indicate during which time slots in duration 'D' UE is unavailable.

Step 2A: AMF (of SIM A/Network A) initiates paging (e.g. when DL data arrives for UE). AMF (of SIM A/Network A) sends paging message to one or more gNB(s). In the paging message AMF (of SIM A/Network A) includes the information about the unavailability information (i.e. gap pattern/unavailability pattern info) received from UE.

Step 2A-1. gNB determines PF/PO for paging UE based on paging configuration and UE ID as explained earlier.

Step 2A-2. gNB checks if the determined PO overlaps with unavailability period (time occasions when UE is unavailable to monitor DL (of SIM A/Network A) i.e. time occasions when UE is monitoring another SIM B/Network B) or not.

If yes, gNB pages in next PO which is not overlapping with UE's unavailability period.

In an embodiment this is the first available PO which is not overlapping with UE's unavailability period. It may correspond to same PF or subsequent PF(s).

In an embodiment this is the first available PO which is not overlapping with UE's unavailability period in the next PF.

In an embodiment this is the first available PO having same PO index, which is not overlapping with UE's unavailability period in the subsequent PF(s).

In an embodiment if there is an available PO corresponding to UE's PF which is not overlapping with UE's unavailability period, UE monitors that. This may be present before UE's PO. If multiple such POs are available, UE may choose the one which occurs first in time.

In an embodiment, from the start of PF, this is the first available PO which is not overlapping with UE's unavailability period. It may correspond to same PF or subsequent PF(s). It may be present before or after UE's PO.

If no, gNB pages in PO determined in step 2A-1.

Note that step 2A-2 is performed every DRX cycle.

In step 2A-2, in an embodiment, gNB determines unavailability period based on its SFN timing and unavailability information received from AMF. Alternately, gNB determines unavailability period based on UTC timing and unavailability information received from AMF.

Step 2B: UE determines PF/PO for paging reception based on paging configuration and UE ID.

Step 2B-1: UE checks if the determined PO overlaps with unavailability period (time occasions when UE is unavailable to monitor DL (of SIM A/Network A) i.e. time occasions when UE is monitoring another SIM B/Network B) or not.

If yes, UE monitors page in next PO which is not overlapping with UE's unavailability period.

In an embodiment this is the first available PO which is not overlapping with UE's unavailability period. It may correspond to same PF or subsequent PF(s).

In an embodiment this is the first available PO which is not overlapping with UE's unavailability period in the next PF.

In an embodiment this is the first available PO having same PO index, which is not overlapping with UE's unavailability period in the subsequent PF(s).

In an embodiment if there is an available PO corresponding to UE's PF which is not overlapping with UE's unavailability period, UE monitors that. This may be present before UE's PO. If multiple such POs are available, UE may choose the one which occurs first in time.

In an embodiment, from the start of PF, this is the first available PO which is not overlapping with UE's unavailability period. It may correspond to same PF or subsequent PF(s). It may be present before or after UE's PO.

If no, UE monitors page in PO calculated in step 2B-1.

Note that step 2B-1 is performed every DRX cycle.

In this design PF/PO monitored by UE in each DRX cycle can be different.

Figure 5:
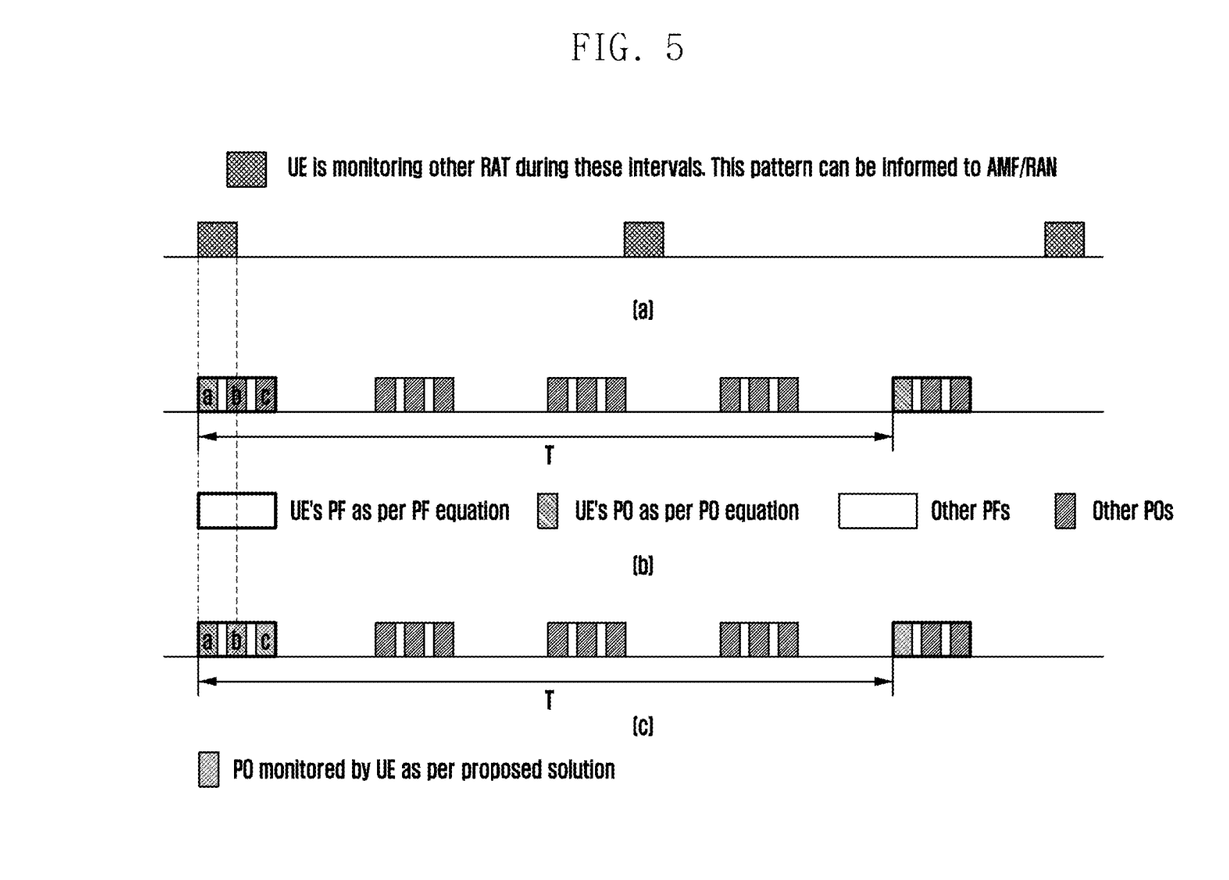
FIG. 5 is an example illustration of the approach according to an embodiment based on the disclosure.

FIG. 5 is an example illustration of this approach according to an embodiment based on the disclosure. FIG. 5(a) illustrates the time intervals where UE monitors other SIM B (say Network B). During these intervals RF is not available for monitoring this SIM A (i.e. Network A). FIG. 5(b) illustrates the paging DRX cycle, PFs, POs, UE's PF and PO for SIM A (i.e. Network A). The PF and PO determined by UE based on PF/PO equation is PF 1 and PO a for SIM A (i.e. Network A). In the DRX cycle, UE's calculated PO (i.e. PO a) based on PF/PO equation overlaps with unavailability period (i.e. time occasions when UE is unavailable to monitor DL (of SIM A/Network A) i.e. time occasions when UE is monitoring another SIM B/Network B). So as illustrated in FIG. 5(c) UE monitors the next available PO (i.e. PO c of PF 1) not overlapping with unavailability period in that DRX cycle. Note that even though FIG. 5 shows that all POs of a PF are located within the PF, it is possible that POs of a PF may be located in subsequent radio frames or may be located in multiple radio frames.

Figure 6:
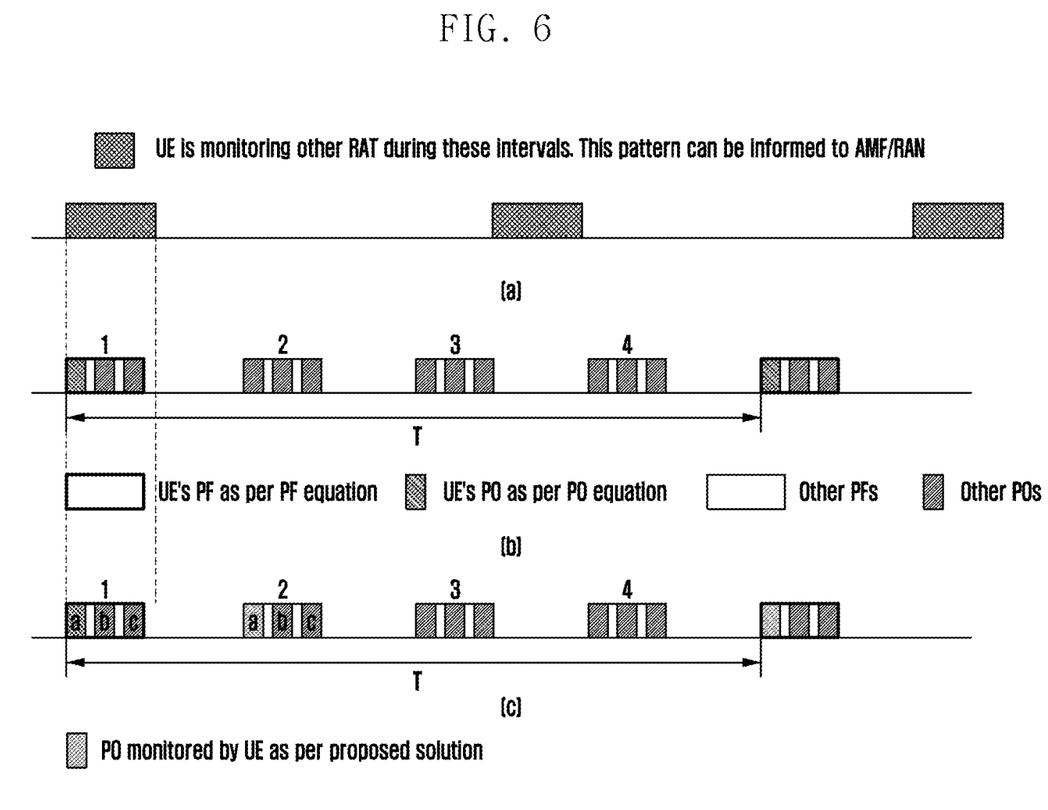
FIG. 6 is an example illustration of the approach according to an embodiment based on the disclosure.

FIG. 6 is an example illustration of this approach according to an embodiment based on the disclosure. FIG. 6(a) illustrates the time intervals where UE monitors other SIM B (say Network B). During these intervals RF is not available for monitoring this SIM A (i.e. Network A). FIG. 6(b) illustrates the paging DRX cycle, PFs, POs, UE's PF and PO for SIM A (i.e. Network A). The PF and PO determined by UE based on PF/PO equation is PF 1 and PO a for SIM A (i.e. Network A). In the DRX cycle, UE's calculated PO (i.e. PO a) based on PF/PO equation overlaps with unavailability period (i.e. time occasions when UE is unavailable to monitor DL (of SIM A/Network A) i.e. time occasions when UE is monitoring another SIM B/Network B). So as illustrated in FIG. 6(c) UE monitors the next available PO (i.e. PO a of PF 2) not overlapping with unavailability period in that DRX cycle. Note that even though FIG. 6 shows that all POs of a PF are located within the PF, it is possible that POs of a PF may be located in subsequent radio frames or may be located in multiple radio frames.

In an embodiment of the disclosure, AMF in above description can be a RAN node (RAN anchor) in case of RAN paging.

Frequency Prioritization Aspects

UE is operating on F1 on Network A (SIM A). UE can be in RRC IDLE/RRC INACTIVE or in RRC CONNECTED. UE is also camped on F2 on Network B (SIM B). In Network B, UE is in coverage of cells on F2 and F3. Priorities of F2>F3 as per prioritization information received in SI and/or dedicated signaling.

RF is shared for F1 and F2 between SIM A and SIM B. RF is shared for F3 and F4 between SIM A and SIM B. As a result UE needs to share the RF in time division multiplexing (TDM) manner when UE is operating on Network A and Network B over carrier F1 and F2 respectively. This is not efficient. UE may not be to perform required operations in Network A if RF is busy performing required operations in Network B.

In an embodiment of this disclosure a MUSIM UE considers priority of frequency as the highest priority if by camping on this frequency MUSIM UE is not required to share its RF resources with another network/SIM. This is irrespective of absolute priority of frequency indicated (e.g. in SI) by network.

In other words, 'if RF is shared for currently camped/operating frequencies of Network A and Network B' AND 'if RF is not shared for camped/operating frequency of network B and another candidate frequency of Network A': MUSIM UE considers the candidate frequency of Network A as the highest priority frequency for camping/operating in Network A, irrespective of absolute priority of that candidate frequency indicated (e.g. in SI) by network.

Alternately, among the candidate carrier frequencies (i.e. frequencies for which one or more cells are available, or frequencies for which one or more cells meet the S-criterion specified in TS 38.304) of a network/SIM, MUSIM UE consider the carrier frequency for which RF is not shared with camped/operating carrier frequency of another network/SIM, as the highest priority frequency. This is irrespective of absolute priority of frequency indicated (e.g. in SI) by network.

In an embodiment MUSIM UE operation is as follows:

1. MUSIM UE is camped/operating on a cell on carrier frequency FA-1 of Network A.

2. MUSIM UE is camped/operating on a cell on carrier frequency FB-1 of Network B.

3. MUSIM UE detects one or more cells on another carrier frequency FA-2 of Network A (or MUSIM UE detects one or more cells on another carrier frequency FA-2 which meet the S-criterion specified in TS 38.304). Priority of frequency FA-2<Priority of frequency FA-1.

4. RF is shared for currently camped/operating frequencies (i.e. FA-1 and FB-1) of Network A and Network B AND RF is not shared for camped/operating frequency of Network B and another candidate frequency of Network A:
  A. MUSIM UE considers the candidate frequency (i.e. FA-2) of Network A as the highest priority frequency for camping/operating in Network A even if absolute priority of FA-2 is not the highest.
  B. MUSIM UE performs reselection to carrier frequency FA-2.

In an embodiment MUSIM UE operation is as follows:
1. MUSIM UE is camped/operating on a cell on carrier frequency FB-1 of Network B/SIM B.
2. One or more cells are available on carrier frequency FA-1 and FA-2 of Network A/SIM
  A. Priority of frequency FA-2<Priority of frequency FA-1.
3. Among the candidate carrier frequencies of Network A (i.e. frequencies for which one or more cells are available, or frequencies for which one or more cells meet the S-criterion specified in TS 38.304), consider the carrier frequency for which RF is not shared with camped/operating carrier frequency of Network B as the highest priority frequency.
  A. MUSIM UE considers the candidate frequency (i.e. FA-2) of Network A as the highest priority frequency for camping/operating in Network A even if absolute priority of FA-2 is not the highest.
  B. MUSIM UE performs reselection to carrier frequency FA-2.

In an embodiment, an indicator can be broadcasted in the cell which allows certain UE types (e.g. MUSIM UE) to override absolute frequency priorities broadcasted in SI. If overriding is allowed according to this indicator then:
  A MUSIM UE considers priority of frequency as the highest priority if by camping on this frequency MUSIM UE is not required to share its RF resources with another network/SIM. This is irrespective of absolute priority of frequency indicated (e.g. in SI) by network.

In other words, 'if RF is shared for currently camped/operating frequencies of Network A and Network B' AND 'if RF is not shared for camped/operating frequency of Network B and another candidate frequency of Network A': MUSIM UE considers the candidate frequency of Network A as the highest priority frequency for camping/operating in Network A, irrespective of absolute priority of that candidate frequency indicated (e.g. in SI) by network.

Alternately, among the candidate carrier frequencies (i.e. frequencies for which one or more cells are available) of a network/SIM, MUSIM UE considers the carrier frequency for which RF is not shared with camped/operating carrier frequency of another network/SIM, as the highest priority frequency. This is irrespective of absolute priority of frequency indicated (e.g. in SI) by network.

In an embodiment, an indicator can be broadcasted in the cell per UE type (MUSIM UE, device-to-device (D2D) UE, vehicle to everything (V2X) UE, etc.) to override absolute frequency priorities broadcasted in SI. If overriding is allowed according to this indicator for MUSIM UE then:
  A MUSIM UE considers priority of frequency as the highest priority if by camping on this frequency MUSIM UE is not required to share its RF resources with another network/SIM. This is irrespective of absolute priority of frequency indicated (e.g. in SI) by network.

In other words, 'if RF is shared for currently camped/operating frequencies of Network A and Network B' AND 'if RF is not shared for camped/operating frequency of Network B and another candidate frequency of Network A': MUSIM UE considers the candidate frequency of Network A as the highest priority frequency for camping/operating in Network A, irrespective of absolute priority of that candidate frequency indicated (e.g. in SI) by network.

Alternately, among the candidate carrier frequencies (i.e. frequencies for which one or more cells are available) of a network/SIM, MUSIM UE considers the carrier frequency for which RF is not shared with camped/operating carrier frequency of another network/SIM, as the highest priority frequency. This is irrespective of absolute priority of frequency indicated (e.g. in SI) by network.

In another embodiment, in addition to indicator (as explained above), percentage of UEs that are allowed to override can also be indicated. For e.g. network can broadcast a value 'p' between 0 and 1. If overriding is allowed according to indicator and a random number drawn by UE between 0 and 1 is below 'p' then:
  A MUSIM UE considers priority of frequency as the highest priority if by camping on this frequency MUSIM UE is not required to share its RF resources with another network/SIM. This is irrespective of absolute priority of frequency indicated (e.g. in SI) by network.

In other words, 'if RF is shared for currently camped/operating frequencies of Network A and Network B' AND 'if RF is not shared for camped/operating frequency of Network B and another candidate frequency of Network A': MUSIM UE considers the candidate frequency of Network A as the highest priority frequency for camping/operating in Network A, irrespective of absolute priority of that candidate frequency indicated (e.g. in SI) by network.

Alternately, among the candidate carrier frequencies (i.e. frequencies for which one or more cells are available) of a network/SIM, MUSIM UE considers the carrier frequency for which RF is not shared with camped/operating carrier frequency of another network/SIM, as the highest priority frequency. This is irrespective of absolute priority of frequency indicated (e.g. in SI) by network.

In another embodiment, network can broadcast a value 'p' between 0 and 1. If 'p' is not signaled overriding is not allowed. If 'p' is signaled and a random number drawn by UE between 0 and 1 is below 'p' then:
  MUSIM UE considers priority of frequency as the highest priority if by camping on this frequency MUSIM UE is not required to share its RF resources with another network/SIM. This is irrespective of absolute priority of frequency indicated (e.g. in SI) by network.

In other words, 'if RF is shared for currently camped/operating frequencies of Network A and Network B' AND 'if RF is not shared for camped/operating frequency of Network B and another candidate frequency of Network A': MUSIM UE considers the candidate frequency of Network A as the highest priority frequency for camping/operating in Network A, irrespective of absolute priority of that candidate frequency indicated (e.g. in SI) by network.

Alternately, among the candidate carrier frequencies (i.e. frequencies for which one or more cells are available) of a network/SIM, MUSIM UE considers the carrier frequency for which RF is not shared with camped/operating carrier frequency of another network/SIM, as the highest priority frequency. This is irrespective of absolute priority of frequency indicated (e.g. in SI) by network.

In an embodiment, UE can send assistance information to the network.

Regardless of the UE is DSDS or dual SIM dual receive (DSDR), the UE provides TDM assistance information and/or frequency division multiplexing (FDM) assistance information.

Whether to provide TDM or FDM solution is indicated by network.

TDM solution involves configuring a gap which allows the UE to monitor the other SIM (e.g. if the UE is DSDS). UE may inform about the gap periodicity and gap length to gNB. gNB can then either confirm or provide gap configuration in RRCReconfiguration message for other SIM monitoring. In an embodiment, gNB can configure multiple configurations. UE can select a configuration as per it needs and inform the gNB using MAC CE or RRC message about the selected configuration. Alternately, gNB can activate one configuration using a MAC CE or DCI. UE uses the activated configuration and can monitor other SIM during the gaps as per the activated configuration.

FDM solution in the form of redirection information or dedicated priorities in RRC Release message allows the UE override absolute priorities for cell reselection or with redirection information UE makes new RRC connection on cell of a different frequency.

In connected mode, UE can inform the Network B to avoid configuring the frequencies which cannot be concurrently monitored by UE based on operating frequency of Network A. UE assistance information can be used for this. For example if operating frequency of Network A is F1 and RF is shared between F2 and F1, MUSIM UE can inform Network B to not configure F2. Network B can avoid handover to F2 or avoid configuring it as secondary cell (SCell) in carrier aggregation (CA) mode.

Figure 7:
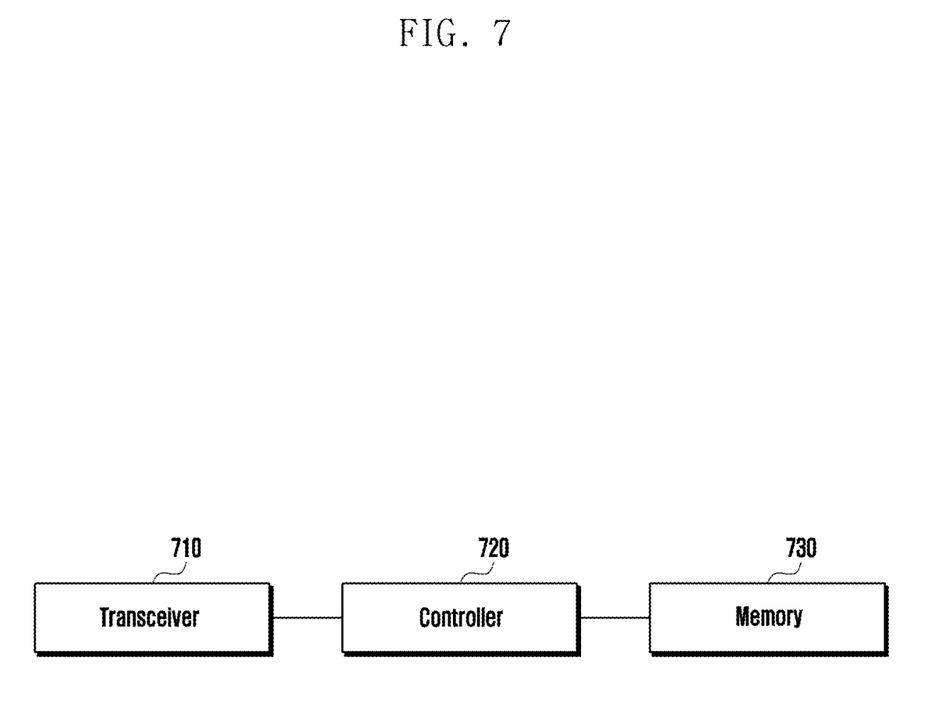
FIG. 7 is a block diagram of a terminal according to an embodiment of the disclosure.

FIG. 7 is a block diagram of a terminal according to an embodiment of the disclosure.

Referring to FIG. 7, a terminal includes a transceiver 710, a controller 720 and a memory 730. The controller 720 may refer to a circuitry, an ASIC, an FPGA, or at least one processor. The transceiver 710, the controller 720 and the memory 730 are configured to perform the operations of the UE illustrated in the figures, e.g., FIGS. 1 to 6, or as otherwise described above. Although the transceiver 710, the controller 720 and the memory 730 are shown as separate entities, they may be integrated onto a single chip. The transceiver 710, the controller 720 and the memory 730 may also be electrically connected to or coupled with each other.

The transceiver 710 may transmit and receive signals to and from other network entities, e.g., a base station. The controller 720 may control the UE to perform functions according to the embodiments described above. In an embodiment, the operations of the terminal may be implemented using the memory 730 storing corresponding program codes. Specifically, the terminal may be equipped with the memory 730 to store program codes implementing desired operations. To perform the desired operations, the controller 720 may read and execute the program codes stored in the memory 730 by using a processor or a central processing unit (CPU).

Figure 8:
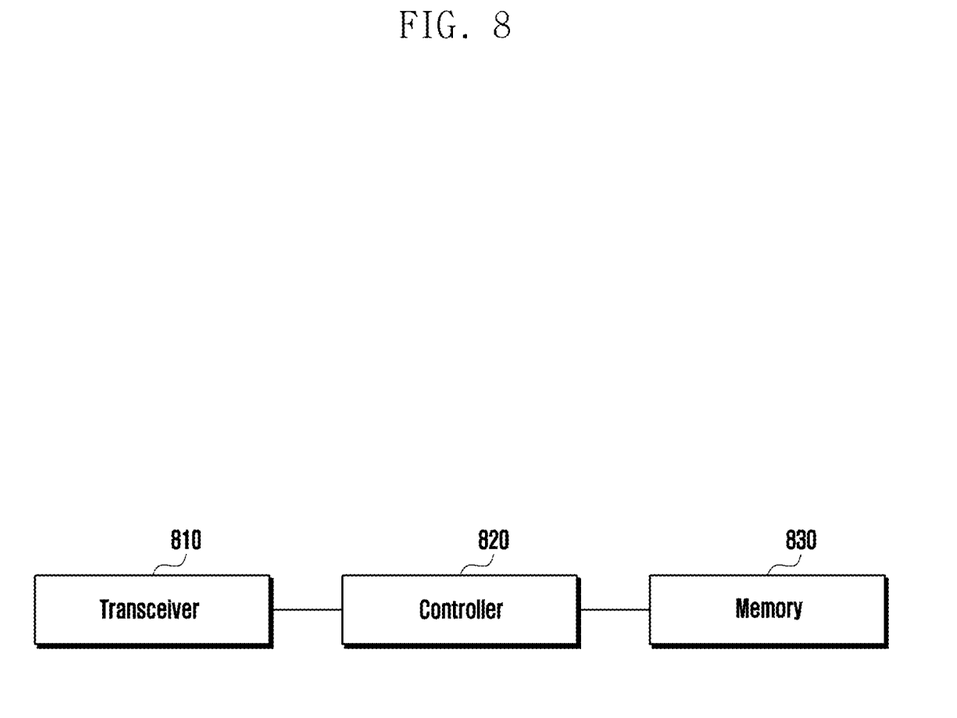
FIG. 8 is a block diagram of a base station according to an embodiment of the disclosure.

FIG. 8 is a block diagram of a base station according to an embodiment of the disclosure.

Referring to FIG. 8, a base station includes a transceiver 810, a controller 820 and a memory 830. The controller 820 may refer to a circuitry, an ASIC, an FPGA, or at least one processor. The transceiver 810, the controller 820 and the memory 830 are configured to perform the operations of the gNB (or network) illustrated in the figures, or as otherwise described above. Although the transceiver 810, the controller 820 and the memory 830 are shown as separate entities, they may be integrated onto a single chip. The transceiver 810, the controller 820 and the memory 830 may also be electrically connected to or coupled with each other.

The transceiver 810 may transmit and receive signals to and from other network entities, e.g., a terminal. The controller 820 may control the gNB to perform functions according to the embodiments of the disclosure. In an embodiment, the operations of the base station may be implemented using the memory 830 storing corresponding program codes. Specifically, the base station may be equipped with the memory 830 to store program codes implementing desired operations. To perform the desired operations, the controller 820 may read and execute the program codes stored in the memory 830 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
monitoring, by the terminal having at least two subscriber identity module (SIM) capabilities and being in a radio resource control (RRC) IDLE state or an RRC INACTIVE state, a system information (SI) update indication in at least one of paging occasions of at least one modification period for a first network associated with a first SIM, wherein the paging occasions include a first paging occasion not related to an identifier (ID) of the terminal;
identifying that the terminal fails to monitor the at least one of paging occasions because of monitoring for a second network associated with a second SIM;
upon resuming monitoring of the first network, reading master information block (MIB) and system information block 1 (SIB1) to determine whether any SI is updated or not;
determining whether any SI is updated or not based on the MIB and the SIB1; and
in case that any SI is updated, acquiring the updated SI.

2. The method of claim 1, further comprising:
monitoring a physical downlink control channel (PDCCH) addressed by a paging radio network temporary identifier (P-RNTI) in any paging occasion of every modification period.

3. The method of claim 1, wherein the paging occasions further include a second paging occasion determined based on the ID of the terminal.

4. The method of claim 1, wherein the terminal fails to monitor the at least one of paging occasions, in case that monitoring of the at least one of paging occasions for a number of consecutive modification periods fails, and
wherein a value of the number of consecutive modification periods is signaled in SI from a base station.

5. A terminal in a wireless communication system, the terminal comprising:
a transceiver; and
at least one processor operatively coupled with the transceiver and configured to:
monitor, by the terminal having at least two subscriber identity module (SIM) capabilities and being in a radio resource control (RRC) IDLE state or an RRC INACTIVE state, a system information (SI) update indication in at least one of paging occasions of at least one modification period for a first network associated with a first SIM, wherein the paging occasions include a first paging occasion not related to an identifier (ID) of the terminal, identify that the at least one processor fails to monitor the at least one of paging occasions because of monitoring for a second network associated with a second SIM, upon resuming monitoring of the first network, read master information block (MIB) and system information block 1 (SIB1) to determine whether any SI is updated or not, determine whether any SI is updated or not based on the MIB and the SIB1, and in case that any SI is updated, acquire the updated SI.

6. The terminal of claim 5, wherein the at least one processor is further configured to monitor a physical downlink control channel (PDCCH) addressed by a paging radio network temporary identifier (P-RNTI) in any paging occasion of every modification period.

7. The terminal of claim 5, wherein the paging occasions further include a second paging occasion determined based on the ID of the terminal.

8. The terminal of claim 5, wherein the at least one processor fails to monitor the at least one of paging occasions, in case that monitoring of the at least one of paging occasions for a number of consecutive modification periods fails, and wherein a value of the number of consecutive modification periods is signaled in SI from a base station.

* * * * *